(12) United States Patent
Salmon et al.

(10) Patent No.: US 10,495,161 B2
(45) Date of Patent: Dec. 3, 2019

(54) METHODS AND APPARATUS TO PERFORM BRAKE SWEEPING PROCEDURES ON VEHICLE BRAKES

(71) Applicant: Ford Global Technologies, LLC, Dearborn, MI (US)

(72) Inventors: Thomas Salmon, Rochester, MI (US); Alex James, Ypsilanti, MI (US); Bang Kim Cao, Northville, MI (US); Donald A. Perlick, Farmington Hills, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 173 days.

(21) Appl. No.: 15/433,833

(22) Filed: Feb. 15, 2017

(65) Prior Publication Data

US 2018/0229698 A1 Aug. 16, 2018

(51) Int. Cl.
| | | |
|---|---|---|
| *B60T 17/22* | (2006.01) | |
| *F16D 65/00* | (2006.01) | |
| *B60T 7/12* | (2006.01) | |
| *B60T 8/24* | (2006.01) | |

(52) U.S. Cl.
CPC .......... *F16D 65/0037* (2013.01); *B60T 7/12* (2013.01); *B60T 17/22* (2013.01); *B60T 17/221* (2013.01); *B60T 8/246* (2013.01); *B60T 2201/124* (2013.01); *B60T 2201/16* (2013.01)

(58) Field of Classification Search
CPC combination set(s) only.
See application file for complete search history.

(56) References Cited

U.S. PATENT DOCUMENTS

| | | | |
|---|---|---|---|
| 6,409,289 B2 | 6/2002 | Wagner et al. | |
| 8,942,907 B2 | 1/2015 | Moore et al. | |
| 2002/0162580 A1* | 11/2002 | Hernandez | B60S 1/528 134/32 |
| 2017/0066442 A1* | 3/2017 | Woodley | B60T 17/221 |

FOREIGN PATENT DOCUMENTS

| | | |
|---|---|---|
| DE | 19947903 | 8/2000 |
| DE | 19846392 | 4/2004 |
| GB | 2478355 | 9/2011 |
| WO | 2005021345 | 3/2005 |

* cited by examiner

*Primary Examiner* — Thomas G Black
*Assistant Examiner* — Ana D Thomas
(74) *Attorney, Agent, or Firm* — Hanley, Flight & Zimmerman, LLC

(57) ABSTRACT

Example methods and apparatus to perform brake sweeping procedures on vehicle brakes are described herein. An example apparatus includes a controller to determine when a vehicle has made a turn, compare an angle at which the vehicle has turned to an angle threshold, and schedule a brake sweeping procedure based on the comparison.

19 Claims, 8 Drawing Sheets

METHODS AND APPARATUS TO PERFORM BRAKE SWEEPING PROCEDURES ON VEHICLE BRAKES

FIELD OF THE DISCLOSURE

This disclosure relates generally to vehicle brakes and, more particularly, to methods and apparatus to perform brake sweeping procedures on vehicle brakes.

BACKGROUND

Vehicles, such as cars and trucks, typically include a brake system having one or more brakes to slow the vehicle. Most vehicles include either drum brakes or disc brakes, which may be hydraulically or electrically actuated. The brakes operate by applying pressure from a pad or shoe to a rotating drum or disc. Vehicle brakes are also commonly used on trailers that are towed by vehicles. In wintry conditions, snow and ice can collect in and around the brake components and reduce the effectiveness of the brake. For example, snow and/or ice can accumulate on the brake disc or around the brake drum, thereby preventing the brake shoe or pad from contacting the brake drum or rotor.

SUMMARY

An example apparatus includes a controller to determine when a vehicle has made a turn, compare an angle at which the vehicle has turned to an angle threshold, and schedule a brake sweeping procedure based on the comparison.

An example computer readable storage medium includes instructions that, when executed, cause a controller to schedule a brake sweeping procedure to be performed by a brake of a vehicle, determine whether at least one delay condition has been met, and delay the brake sweeping procedure when at least one delay condition has been met.

An example computer readable storage medium includes instructions that, when executed, cause a controller to schedule a brake sweeping procedure to be performed by a brake of a vehicle, determine a number of turns the vehicle has made within a period of time, and select a pressure to be applied by the brake during the brake sweeping procedure based on the number of turns.

Figure 1:
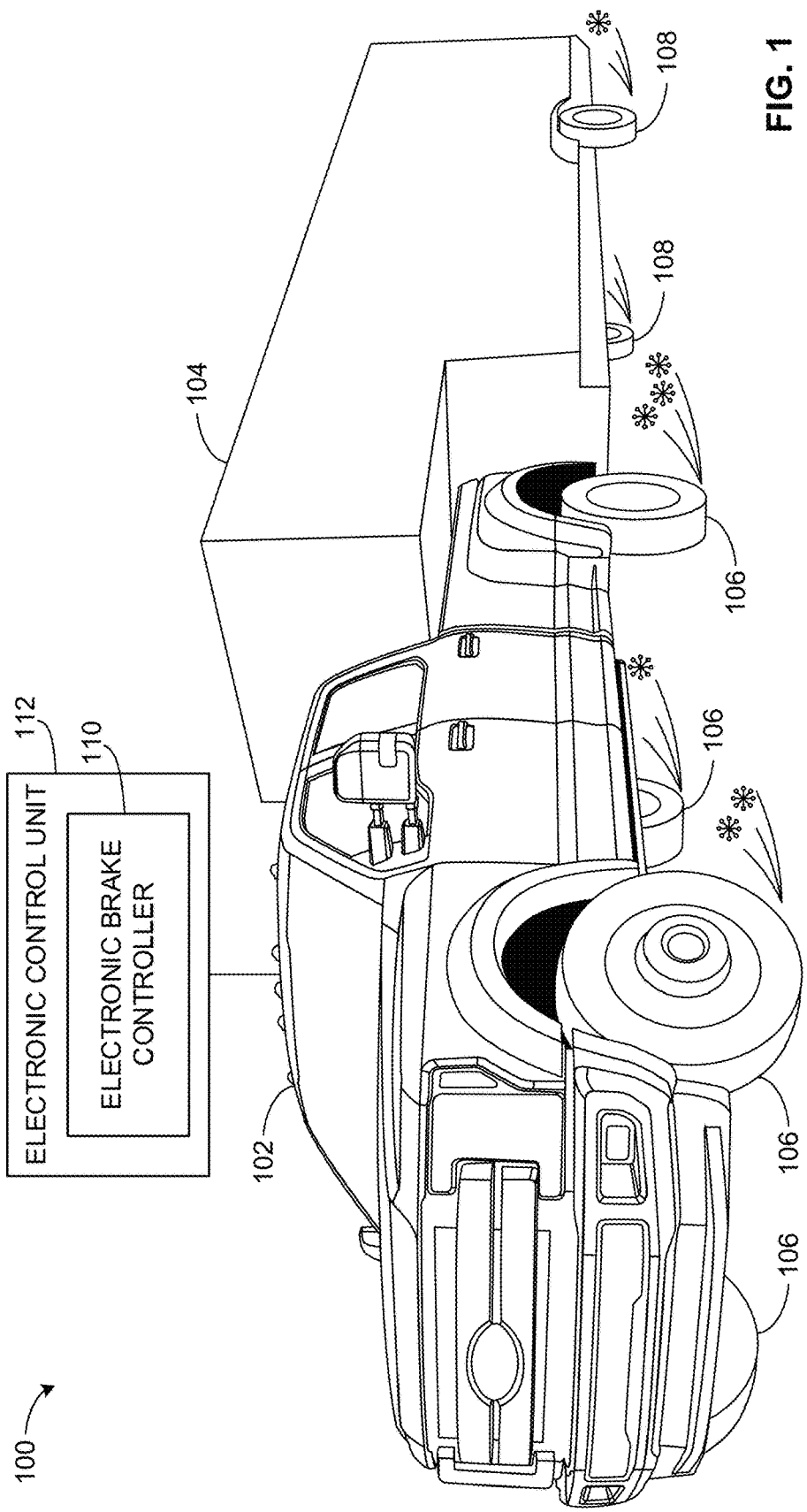
FIG. 1 illustrates an example vehicle trailer system including an example vehicle and an example trailer in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example methods, apparatus and articles of manufacture for scheduling and/or implementing a brake sweeping procedure to clear snow, ice and/or other debris from a vehicle brake. By removing the debris from the vehicle brake, the example methods, apparatus and articles of manufacture disclosed herein reduce the possibility of brake slippage that may result if the debris remained on the vehicle brake. As such, the examples disclosed herein achieve increased safety.

Brakes are an integral component of modern vehicles. Most brakes on vehicles are either disc or drum brakes, which are either hydraulically or electrically actuated. Vehicle brakes are used on trailers and/or other equipment towed by a vehicle to help slow the trailer or equipment. For example, many trailers include electric drum brakes, which are actuated when the driver applies the brake pedal in the vehicle.

Vehicle brakes operate by applying pressure from one fixed part against a rotating part to help slow the rotating part via friction. For example, disc brakes utilize a pad and rotating disc, otherwise known as a rotor. A caliper presses the pad against the rotor to slow the rotor (via friction) and, thus, slow the vehicle. Drum brakes, for example, utilize a shoe and rotating drum. The shoe is located within the drum and is forced radially outward against an inner surface of the drum to slow the drum (via friction) and slow the vehicle. Electric drum brakes, such as those commonly found on trailers, include an electromagnetic actuator within the rotating drum. When an electric current is passed through the electromagnet of the actuator, the electromagnet is energized and is attracted toward the face of the rotating drum. When the electromagnet engages the face of the drum, friction from the face of the rotating drum moves the electromagnet in the direction of the drum rotation, which moves an arm to extend the brake shoes radially outward against the inner surface of the rotating drum.

The brakes of a vehicle are manually activated by pressing a brake pedal. In some examples, pressing the brake pedal applies hydraulic pressure to a brake caliper. Additionally or alternatively, pressing the brake pedal may activate an electromagnet in an electric brake. With electric drum brakes on trailers, for example, the vehicle may include an electronic brake controller (e.g., a trailer brake controller) that energizes the electromagnetic actuator when the driver presses the brake pedal.

While vehicle brakes (such as those found on the vehicle and/or the trailer) are generally effective in optimal conditions (e.g., cool, dry environments), brakes are often less effective in other conditions such as, for instance, in wintry conditions or environments. In winter environments, snow, ice, slush, etc. can collect in and around the vehicle brake, thereby preventing the brake from operating as intended. For instance, when towing a trailer, snow and ice are often projected from the tow vehicle (e.g., when turning) and collects in the brakes of the trailer being towed. Similarly, snow, ice, slush, etc. may be projected from the front wheels and collect in the brakes of the rear wheels of the vehicle.

The snow, ice and/or other debris can enter the space between the pad and rotor or the shoe and drum and, thus, adversely affect the braking capabilities of the vehicle. Additionally, with electric drum brakes, snow and ice can collect between the magnet and the face of the drum. As a result, when the driver applies the brake, the snow and ice reduce friction between the parts of the brake. In some instances, proper braking friction may be delayed until the snow or ice is melted or scraped away (e.g., via friction). In some instances, the heat generated from the brake melts the snow and ice into water. However if the water is permitted to remain on the cooling brakes, the water freezes and forms ice, and, thus, the brake may not operate properly.

Disclosed herein are example methods, apparatus and articles of manufacture that implement a brake sweeping procedure to remove debris (e.g., ice, snow, slush, etc.) from a vehicle brake. As used herein, the term "brake sweeping procedure" means the application of a brake at a pressure below full braking pressure to remove debris that may otherwise adversely affect the intended braking function. Example electronic brake controllers are disclosed herein that may schedule and perform brake sweeping procedures. In some examples, a brake controller determines when to schedule a brake sweeping procedure based on one or more conditions (e.g., parameters, factors, etc.) that are indicative of outside conditions (e.g., winter conditions) that could result in ice and snow buildup around/in the brakes. If the condition(s) is/are met, the example electronic brake controller schedules a brake sweeping procedure to be performed on a brake. During a brake sweeping procedure, the example electronic brake controller activates the brake (e.g., hydraulically or electrically) at a pressure below normal braking pressure, such that the vehicle and/or trailer is not significantly slowed and, thus, does not affect the driving of the vehicle and/or trailer. However, by applying the brake, snow and ice or other debris are cleared from the brake (e.g., via heat and/or friction) without creating a noticeable braking event. Then, when the driver manually activates the brake at a later time, the debris is cleared from the brake and the brake can operate as intended. In some examples, the example electronic brake controller controls one of the brakes. In other example, the electronic brake controller may control multiple brakes simultaneously.

In some examples, information received from one or more vehicle sensor(s) can be used to determine if the surrounding environment and/or the driving pattern indicate(s) the possibility of ineffective brakes due to snow and ice. This information is used to determine whether the condition(s) has/have been met to initiate the scheduling of a brake sweeping procedure. In some examples, one or multiple conditions may need to be met to schedule a brake sweeping procedure. For example, one condition may be a temperature condition. One or more sensor(s) on the vehicle may be used to detect the ambient temperature around the vehicle. The temperature condition may be satisfied or triggered if the ambient temperature is below a temperature threshold (e.g., 0° Celsius (C)) that may be associated with snow or ice formation. Another example condition may be the presence of a low friction driving surface, such as a road with ice or snow. In some examples, the presence of a lower friction driving surface is determined based on a propulsive wheel torque measurement. The propulsive wheel torque may be determined by a wheel torque sensor that measures the torque generated between the wheel and the road and/or by a wheel torque estimator that determines the torque based on revolutions-per-minute (RPM), fuel quantity, spark timing, etc. In some examples, a low propulsive wheel torque may indicate the wheels are slipping due to a low friction surface, a driver is accelerating slowly in recognition of the low friction surface and/or a traction control system is keeping the wheel torque low to prevent the wheels from slipping on the low friction surface, whereas a high propulsive wheel torque may indicate the wheels are not slipping. In such an example, the condition may be triggered if the propulsive wheel torque is below a threshold wheel torque.

Another example condition may be the occurrence of a brake control event. A brake control event may include, for example, activation of the anti-lock brake system (ABS) and/or the electronic stability control (ESC) system (e.g., the traction control system, yaw control system, and stability control system). These systems activate the brakes to control the vehicle when control of the vehicle cannot be properly be maintained by the driver. These events are often activated while the vehicle is driving on roads covered in snow or ice and, thus, may be indicative of winter conditions.

Another example condition may be a speed condition. In some instances, the wheels of a faster moving vehicle project more snow or other debris onto or around the brakes than a slower moving vehicle. In some examples, the speed condition may be triggered when the speed of the vehicle meets a speed threshold (e.g., 45 miles-per-hour (MPH)). In some examples, the speed of the vehicle is determined by a wheel speed sensor. Additionally or alternatively, one or more other sensor(s) (e.g., an accelerometer or a Global Positioning Satellite (GPS) sensor) may be used to determine the speed of the vehicle. Another example condition may be a turn condition, which indicates how many turns the vehicle has made. In some instances, a vehicle projects more snow and ice during a turn than when driving straight. As such, a turn may be indicative of more snow or ice being collected in the brake. In some examples, a turn is counted when the angle of the turn meets an angle threshold (e.g., 30 degrees) (° in either direction). In some examples, one turn that satisfies the angle threshold triggers the turn condition. In other examples, multiple turns (e.g., two turns, three turns, etc.) are needed to trigger the turn condition. In some examples, the angle of a turn is determined by a steering wheel angle sensor, which senses the angle of the steering shaft. Additionally or alternatively, the angle of the turn can be measured using an inertial measurement unit (IMU) (e.g., which may include one or more accelerometers, gyroscopes, etc.) and/or a GPS sensor. For example, the IMU may be used to measure the lateral accelerations of the vehicle in a turn. In other examples, the GPS sensor may be used to detect a turn by measuring the radius of an arc travelled by the vehicle.

If the driving conditions and/or the driving pattern indicate a risk of adverse brake effects (e.g., based on the one or more conditions being met), the electronic brake controller can schedule a brake sweeping procedure to remove or clear any snow, ice, and/or other debris that may otherwise cause the brake to operate ineffectively. In some examples, only one condition (e.g., the turn condition) is used to determine when to schedule a brake sweeping procedure. When the condition is met, a brake sweeping procedure is scheduled. In other examples, multiple conditions (e.g., the temperature condition, the wheel torque condition, the brake control event condition, the speed condition and/or the turn condition) are used to determine when to schedule a brake sweeping procedure. As such, the example electronic brake controller monitors the condition(s) and, when one or more of the conditions are met (e.g., triggered), the example electronic brake controller schedules a brake sweeping procedure.

In some examples, the brake sweeping procedure is performed immediately (or within a few seconds) after the brake sweeping procedure is scheduled. In other examples, the electronic brake controller may delay the scheduled brake sweeping procedure based on one or more delay conditions. For example, the electronic brake controller may determine that it is not a safe time to implement the brake sweeping procedure and may delay the brake sweeping procedure until a more optimal time arises. In this manner, the electronic brake controller ensures safe driving conditions.

For example, the electronic brake controller may delay the brake sweeping procedure if the vehicle is currently in a turn. In some instances, activation of the brake sweeping procedure while the vehicle is turning on a low friction driving surface may cause the vehicle and/or the trailer to lose control. Therefore, the electronic brake controller may delay the brake sweeping procedure if the vehicle is turning. In some examples, the controller may determine the vehicle is turning based on measurements from the vehicle IMU and/or steering wheel angle sensor. In some examples, the delay condition is met when a turn angle of the vehicle meets or exceeds an angle threshold (e.g., 30°). Thus, if the vehicle is turning at an angle greater than the angle threshold in either direction, the brake sweeping procedure is delayed. Additionally or alternatively, the brake sweeping procedure may be delayed if the brakes have been applied within a specified time period (e.g., within the last two minutes). In some examples, the brake sweeping procedure is delayed for a period of time (e.g., 10 seconds, two minutes, etc.), and then the delay condition(s) is/are checked again. If the delay condition(s) are not met or satisfied, the electronic brake controller implements the brake sweeping procedure.

In some examples, the brake sweeping procedure includes application of the brake at a relatively low pressure (e.g., 30% duty cycle), which applies sufficient pressure to remove snow and ice forming on the brake system, but not enough pressure to significantly affect the driving of the vehicle. In some examples, the application of the brake applies a variable pressure based on one or more of the conditions used to schedule the brake sweeping procedure. For example, the pressure applied during the brake sweeping procedure may be based on the number of turns (e.g., determined via a turn counter) within a period of time (e.g., since the last brake sweeping procedure, the last 2 times, etc.). For instance, the electronic brake controller may activate the brake to apply a first level of pressure (e.g., a 15% duty cycle) when the number of turns does not meet a turn counter threshold (e.g., two or more turns), and the electronic brake controller may activate the brake to apply a second level of pressure (e.g., 30% duty cycle) greater than the first level of pressure when the number of turns does meet the turn counter threshold. As such, the electronic brake controller applies a greater pressure if the vehicle has made more turns (which can be indicative of more snow and ice collected in the brakes). In some examples, the brake controller may vary the time and/or frequency of application of the brake. For example, the brake controller may apply the brake five times for one second each time. In other examples, the frequency and/or duration of application may larger or smaller.

FIG. 1 illustrates an example vehicle trailer system 100 in which the examples disclosed herein may be implemented. In the illustrated example, the vehicle trailer system includes a vehicle 102 and a trailer 104 that is towed by the vehicle 102. The vehicle 102 includes four wheels 106, each with a brake. The brakes of the vehicle 102 may be, for example, hydraulic drum brakes. However, in other examples, the brakes of the vehicle 102 may be hydraulic disc brakes. When the driver presses on a brake pedal in the cabin of the vehicle 102, the brakes are hydraulically actuated to slow the vehicle 102. Similarly, in the illustrated example of FIG. 1, the trailer 104 includes two wheels 108, each with a brake. The brakes on the trailer may be, for example, electric drum brakes. The brakes on the trailer 104 are electrically coupled (via a cable) to an example electronic brake controller 110. In the illustrated example, the electronic brake controller 110 is implemented by an example electronic control unit 112 in the vehicle 102. When the driver presses on the brake pedal, the electronic brake controller 110 activates (e.g., via a control signal) one or both of the brakes on the trailer 104. In some examples, the electronic brake controller 110 may also control one or more of the brakes on the vehicle 102. The example electronic brake controller 110 may schedule and/or actuate one or more of the brakes on the vehicle 102 and/or the trailer 104 to perform a brake sweeping procedure, as disclosed in further detail herein.

In the illustrated example of FIG. 1, the vehicle 102 is implemented as a pick-up truck. However, in other examples, the vehicle 102 may be implemented as any other type of vehicle, such as a sedan, a van, etc. The trailer 104 may be any type of trailer such as a flatbed trailer, dry freight trailer, livestock trailer, or any other trailer.

When driving in winter conditions, snow, ice and/or other debris may be collected in the brakes of the trailer 104. For example, snow, ice and/or other debris may be projected from the wheels 106 of the vehicle 102 into the air, which can accumulate in the brakes of the trailer 104 that is towed behind the vehicle 102. In some examples, an example tandem axle trailer may project snow, ice, and/or other debris from one set of wheels onto the second set of wheels, which can accumulate in the brakes of the second set of wheels. The snow, ice and/or other debris may adversely affect the functions of the brakes.

Figure 2:
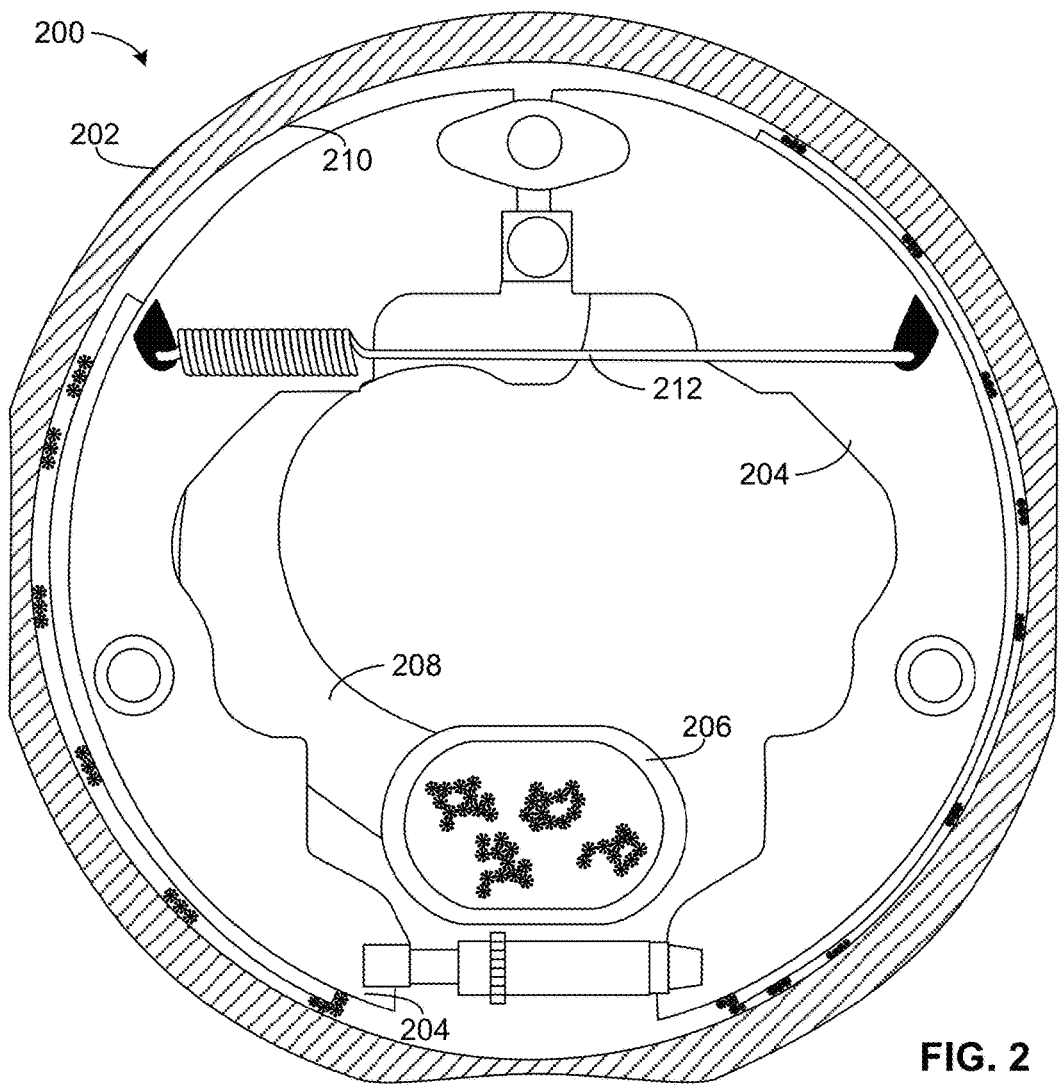
FIG. 2 illustrates an example electric drum brake that may be implemented on the example trailer of FIG. 1.

FIG. 2 illustrates an example electric drum brake 200 that may be implemented on the trailer 104 of FIG. 1. In the illustrated example, the electric drum brake 200 includes a rotating drum 202, two shoes 204, and an electromagnet 206 (e.g., a brake actuator) carried by an actuation arm 208. In the illustrated example, the drum 202 has been cross-sectioned to expose the internal components of the electric drum brake 200. Although not shown, the drum 202 includes a face that covers the components depicted in FIG. 2. The electric drum brake 200 is operated by activating (e.g., energizing) the electromagnet 206, which causes the electromagnet 206 to move toward the face of the drum 202 (i.e., outward from the drawing in FIG. 2). When the electromagnet 206 contacts face of the rotating drum 202, friction between the rotating drum 202 and the electromagnet 206 moves the electromagnet 206 in the direction of the rotating drum 202. The electromagnet 206 moves the actuation arm 208, which extends the shoes 204 radially outward toward an inner surface 210 of the rotating drum 202. The friction between the shoes 204 and the rotating drum 202 slows the rotating drum 202 and, thus, slows the trailer 104 (FIG. 1). In the illustrated example, the electric drum brake 200 includes a retraction mechanism 212, such as a spring, which retracts the shoes 204 back to their original position when the electromagnet 206 is no longer being energized.

Accumulation of snow, ice, and/or other debris between the shoes 204 and the drum 202, between the electromagnet 206 and the drum 202, and/or between other surfaces of the electric drum brake 200 may adversely affect the braking function. For example, ice or snow on the surface of the electromagnet 206 may prevent the friction needed to move the actuation arm 208. As a result, the shoes 204 are not actuated outward to contact the rotating drum 202. Thus, the electric drum brake 200 may not be able to slow the trailer 104 until the snow and ice is melted or scraped away.

To remove or clear snow, ice and/or other debris from in or around the components of the electric drum brake 200, an example brake sweeping procedure may be performed. The brake sweeping procedure applies the brake at a pressure below full braking pressure but at a sufficient pressure to wear away (e.g., via friction or heat) any ice or snow. By removing the snow, ice, and/or other debris, the brake sweeping procedure ensures the proper operation of the electric drum brake 200. While the examples disclosed here are described in connection with the electric drum brake 200 of FIG. 2, the examples disclosed herein may likewise be implemented in connection with any other type of brake, such as a disc brake. Further, the examples disclosed herein may be implemented in connection with brakes that are hydraulically or air actuated.

Figure 3:
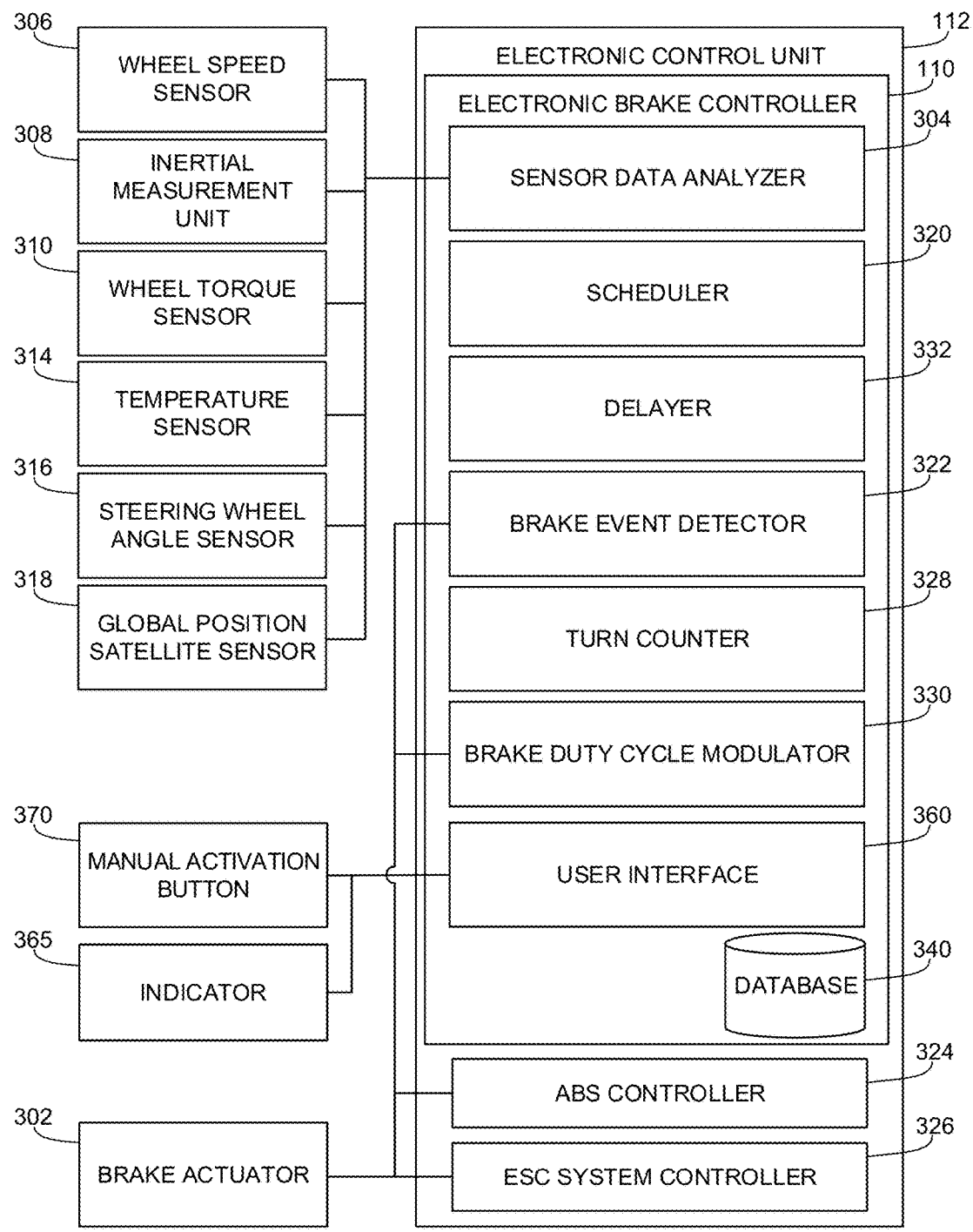
FIG. 3 is a block diagram of an example electronic brake controller implemented by an example electronic control unit in the example vehicle trailer system of FIG. 1.

FIG. 3 is a block diagram of the example electronic control unit 112 of FIG. 1. In some examples, the electronic control unit 112 activates and controls one or more of the systems of the vehicle 102, such as the engine and powertrain systems, the electronic mechanisms in the doors, etc. In the illustrated example, the electronic brake controller 110 is implemented by the electronic control unit 112. However, in other examples, the electronic brake controller 110 may be separate from the electronic control unit 112.

In the illustrated example, the electronic brake controller 110 controls a brake actuator 302. The brake actuator 302 may correspond to, for example, the electromagnet 206 of the electric drum brake 200 of FIG. 2. While only one brake actuator 302 is illustrated in FIG. 3, in some examples, the electronic brake controller 110 also controls the other brake(s) of the trailer 104 and/or the brake(s) of the vehicle 102. In other examples, separate electronic brake controllers 110 may be used to control each brake individually.

In the illustrated example, the electronic brake controller 110 includes a sensor data analyzer 304 that receives and analyzes information from one or more vehicle sensors. In the illustrated example, the vehicle sensors include a wheel speed sensor 306, an inertial measurement unit (IMU) 308, a wheel torque sensor 310, a temperature sensor 314, a steering wheel angle sensor 316, and a GPS sensor 318. In other examples, the vehicle sensors may include more or fewer sensors. Information received from one or more vehicle sensor(s) can be used to determine if the surrounding environment and/or the driving pattern indicate a possibility of ineffective brakes due to snow and ice.

To determine whether to implement a brake sweeping procedure, the electronic brake controller 110 includes a scheduler 320. The scheduler 320 receives information from the sensor data analyzer 304 and analyzes the information to determine whether to schedule a brake sweeping procedure. One example condition may be a temperature condition. In some examples, the temperature condition is triggered if the ambient temperature is below a temperature threshold. In some examples, the temperature threshold is 0° C. In other examples the temperature threshold may be higher or lower. The ambient temperature may be measured by, for example, the temperature sensor 314. The temperature sensor 314 may be implemented by a thermistor, a thermocouple, and/or any other temperature sensor.

Another example condition may be the occurrence of a low friction ($\mu$) surface (e.g., $\mu \approx 0.4$ for snow, $\mu \approx 0.1$ for ice), which is based on the propulsive wheel torque measurement. In some examples, the sensor data analyzer 304 receives the propulsive wheel torque measurement from the wheel torque sensor 310, which measures the torque between one of the wheels 106 (FIG. 1) and the road. Additionally or alternatively, the sensor data analyzer 304 may calculate the wheel torque based on one or more conditions of the vehicle 102, such as the RPM of the engine, the fuel quantity and/or the spark timing. In some examples, a low wheel torque measurement is indicative of the example vehicle 102 (FIG. 1) driving on a low friction surface. In some examples, the low friction or wheel torque condition is triggered if the propulsive wheel torque measurement is below a threshold wheel torque, such as 400 newton-metres. In other examples, the threshold wheel torque may be higher or lower.

Another example condition may be the occurrence of a brake control event, which may be detected by a brake event detector 322. In the illustrated example, the electronic control unit 112 includes an ABS controller 324 and an ESC system controller 326. The brake event detector 322 detects when one or both of the ABS controller 324 and/or the ESC system controller 326 are utilized to activate the brake actuator 302. Brake control events, such as the activation of the ABS controller 324 and/or the ESC system controller 326, are indicative of winter conditions. Additionally or alternatively, the brake event detector 322 may detect brake events from one or more other systems of the vehicle 102 (FIG. 1), such as a traction control system, a yaw control system, etc. Another example condition may be a speed condition. In some examples, the speed condition is triggered when the vehicle speed meets a speed threshold, such as 45 MPH. In some examples, the vehicle speed is detected by the wheel speed sensor 306, which measures the rotational rate of the wheel 106 of the vehicle 102. Additionally or alternatively, the vehicle speed may be determined by the IMU 308 and/or the GPS sensor 318.

Another example condition may be a turn condition. The turn condition may be triggered if the vehicle 102 has turned a predetermined number of times. In some examples, the predetermined number of times is one. In other examples, the predetermined number of times is more than one (e.g., two, three, etc.). In some examples, the number of turns the vehicle 102 has made is counted (e.g., logged) via a turn counter 328. In some examples, the scheduler 320 determines the vehicle 102 has made a turn when an angle at which the vehicle 102 has turned meets or exceeds an angle threshold. In some examples, to determine whether a turn has been made, the scheduler 320 compares an angle of the steering shaft or steering wheel to an angle threshold. The angle threshold may be, for example, 30°. In other examples, the angle threshold may be greater or less than 30°. The angle of the steering shaft/wheel may be measured by the steering wheel angle sensor 316. Additionally or alternatively, the angle of the turn can be measured using the IMU 308 and/or the GPS sensor 318. For example, the IMU 308 may measure the lateral accelerations of the vehicle 102 during a turn. In some examples, a turn may be counted when a lateral acceleration of the vehicle 102 (e.g., measured by a lateral acceleration sensor of the IMU 308) meets or exceeds a lateral acceleration threshold. In other examples, the GPS sensor 318 may be used to detect a turn by measuring the radius of an arc travelled by the vehicle 102. In some examples, the radius of the arc is used to determine an average turning angle.

In some examples, the scheduler 320 schedules a brake sweeping procedure when one condition is triggered. In other examples, multiple conditions are needed for the scheduler 320 to schedule a brake sweeping procedure. For example, the scheduler 320 may schedule a brake sweeping procedure if the ambient temperate is less than the threshold temperature (e.g., the temperature condition is met), the vehicle's propulsive wheel torque measurement indicates the vehicle 102 is traveling on a low friction surface (e.g., the wheel torque condition is met), at least one brake control event has been activated (e.g., the brake control condition is met), the vehicle speed meets or exceeds the speed threshold (e.g., the speed condition is met), and the vehicle 102 has made at least one turn (e.g., the turn condition is met).

In the illustrated example, the electronic brake controller 110 includes a brake duty cycle modulator 330 to activate the brake actuator 302 (e.g., via a control signal). In some examples, once the brake sweeping procedure is scheduled, the procedure is executed by the brake duty cycle modulator 330. The brake duty cycle modulator 330 may activate the brake actuator 302 for a period of time (e.g., 2 seconds, 5 seconds) to remove the snow, ice and/or other debris. In some examples, the brake duty cycle modulator 330 activates the brake actuator 302 via a plurality of pulses, such that the brake is applied repeatedly during a period of time. For example, the brake duty cycle modulator 330 may activate the brake actuator 302 five times, each for a one second time duration, with a one second delay between each application. In another example, the brake duty cycle modulator 330 may activate the brake actuator 302 ten times, each for a two second time duration, with a one second delay between each application. In some examples, the frequency and/or duration of the brake applications may be based on one or more of the conditions used to determine whether to implement a brake sweeping procedure. For example, if the number of turns of the vehicle is greater than a threshold, the brake duty cycle modular 330 may apply the brake more times or for longer periods of time than if the number of turns is below the threshold. After the brake sweeping procedure has been performed, the example process starts over again and the example scheduler 320 determines whether the one or more conditions have been met.

In some examples, prior to implementing the brake sweeping procedure, a delayer 332 checks for one or more delay conditions. If the one or more of the delay conditions are met, the delayer 332 delays the brake sweeping procedure for a period of time and then rechecks (e.g., re-determines) for the presence of the delay condition(s). An example delay condition may be based on the occurrence of a brake event within a period of time. For example, the delayer 332 may determine whether the brake has been applied within the last two minutes. If the brake has been applied within the last two minutes, the example delayer 332 delays the brake sweeping procedure for a period of time (e.g., three minutes) and then rechecks the delay condition. In other examples, the period of time may be more or less. Another example delay condition may be based on whether the vehicle 102 is currently turning. If the delayer 332 determines the vehicle 102 is currently turning, the delayer 332 delays the brake sweeping procedure for a period of time (e.g., 10 seconds) and then rechecks the delay condition. In some examples, the delayer 332 determines the vehicle 102 is in a turn based on a turn angle. For example, the delayer 332 may compare an angle at which the vehicle 102 is turning to an angle threshold (e.g., 10°). If the angle of the vehicle 102 meets or exceeds the angle threshold, the delayer 332 delays the break sweeping procedure for a period of time and then rechecks the delay condition. If the delay condition(s) are not met, the example brake duty cycle modulator 330 activates the brake actuator 302 to perform the brake sweeping procedure.

In the illustrated example, the electronic control unit 112 includes a database 340. The database 340 may store information relating to the threshold(s) for the one or more brake sweeping condition(s) and/or delay condition(s). In some examples, the database 340 stores (e.g., as a time-stamped record) the turns and/or brake events made by the vehicle 102.

In the illustrated example, the brake duty cycle modulator 330 controls the brake actuator 302 by sending a pulse width modulation (PWM) signal to the brake actuator 302 (e.g., the electromagnet 206 of FIG. 2). In some examples, the brake duty cycle modulator 330 actuates the brake actuator 302 to apply a pressure at a level less than full braking pressure. For example, the brake duty cycle modulator 330 may activate the brake actuator 302 at a 30% duty cycle. In such an example, the brake actuator 302 applies enough pressure to remove any debris on the friction surfaces of the brake, but not enough pressure that the driver of the vehicle 102 notices the activation of the brake. In some examples, if the brake is hydraulically actuated, the brake duty cycle modulator 330 activates the brake actuator 302 (e.g., a brake pump) to pump hydraulic fluid into the brake caliper at the desired pressure.

In some examples, the brake duty cycle modulator 330 activates the brake actuator 302 to apply a different pressure level based on a number of turns the vehicle 102 has made (e.g., as logged by the turn counter 328). If the turn counter 328 indicates the vehicle 102 has exceeded a turn count threshold, the brake duty cycle modulator 330 operates the brake actuator 302 at a higher duty cycle, such as 30%. Otherwise, if the turn counter 328 indicates the vehicle 102 has not exceed the turn counter threshold, the brake duty cycle modulator 330 operates the brake actuator 302 at a lower duty cycle, such as 15%. In some examples, the turn count threshold is five turns. In other examples, the turn count threshold may be higher or lower than five turns. The brake duty cycle modulator 330 may activate the brake actuator 302 one time or multiple times (e.g., at a predetermined frequency) for a period of time.

Figure 4:
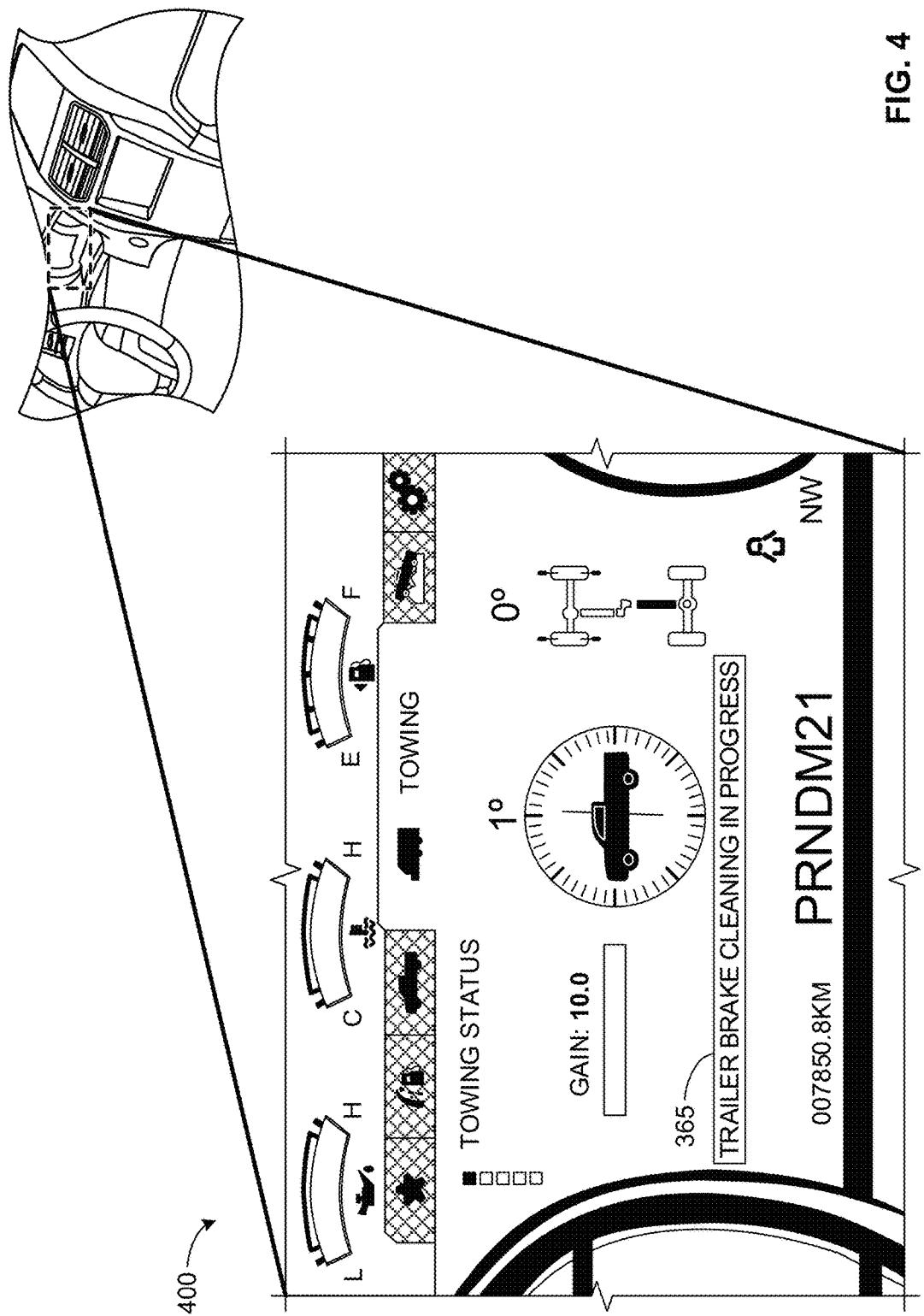
FIG. 4 is an example vehicle user interface with an example brake sweeping procedure indicator that may be activated by the example electronic brake controller of FIG. 3 and implemented in the example vehicle of FIG. 1.

In the illustrated example, the electronic brake controller 110 includes a user interface 360. The user interface 360 may activate an indicator 365 when the brake sweeping procedure is being implemented to alert the driver that the brake sweeping procedure is occurring. For example, FIG. 4 illustrates an example vehicle graphical display 400 that may be located on the dashboard or the infotainment system of the vehicle 102 of FIG. 1. In the illustrated example, the vehicle graphical display 400 includes the indicator 365, which is implemented as a status light (e.g., "Trailer Brake Cleaning In Progress"). When the brake sweeping procedure is being implemented, the user interface 360 (FIG. 3) activates (e.g., illuminates, displays) the status light. In other examples, the indicator 365 may be an alarm, an icon on a display screen (e.g., a display screen of the infotainment system), a flashing light, and/or any other audio or visual signal to indicate that the brake sweeping procedure is occurring.

Referring back to FIG. 3, the vehicle 102 may include a manual activation button 370, which may be located in the cabin of the vehicle 102 (e.g., under the dashboard, on the dashboard, etc.). The manual activation button 370 enables the driver to manually activate (e.g., schedule) a brake sweeping procedure. The user interface 360 may receive a signal from the manual activation button 370 if the driver requests a brake sweeping procedure to be performed. In some examples, the electronic brake controller 110 may immediately activate the brake actuator 302 to perform the brake sweeping procedure. In other examples, the delayer 332 may check for the presence of the one or more delay conditions before enabling the brake sweeping procedure to be performed.

While an example manner of implementing the example electronic brake controller 110 is illustrated in FIG. 3, one or more of the elements, processes and/or devices illustrated in FIG. 3 may be combined, divided, re-arranged, omitted, eliminated and/or implemented in any other way. Further, the example sensor data analyzer 304, the example scheduler 320, the example delayer 332, the example brake event detector 322, the example turn counter 328, the example brake duty cycle modulator 330, the example user interface 360, the example database 340, and/or, more generally, the example electronic brake controller 110 of FIG. 3 may be implemented by hardware, software, firmware and/or any combination of hardware, software and/or firmware. Thus, for example, any of the example sensor data analyzer 304, the example scheduler 320, the example delayer 332, the example brake event detector 322, the example turn counter 328, the example brake duty cycle modulator 330, the example user interface 360, the example database 340, and/or, more generally, the example electronic brake controller 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, sensor data analyzer 304, the example scheduler 320, the example delayer 332, the example brake event detector 322, the example turn counter 328, the example brake duty cycle modulator 330, the example user interface 360, the example database 340 is/are hereby expressly defined to include a tangible computer readable storage device or storage disk such as a memory, a digital versatile disk (DVD), a compact disk (CD), a Blu-ray disk, etc. storing the software and/or firmware. Further still, the example electronic brake controller 110 of FIG. 3 may include one or more elements, processes and/or devices in addition to, or instead of, those illustrated in FIG. 3, and/or may include more than one of any or all of the illustrated elements, processes and devices.

Figure 5:
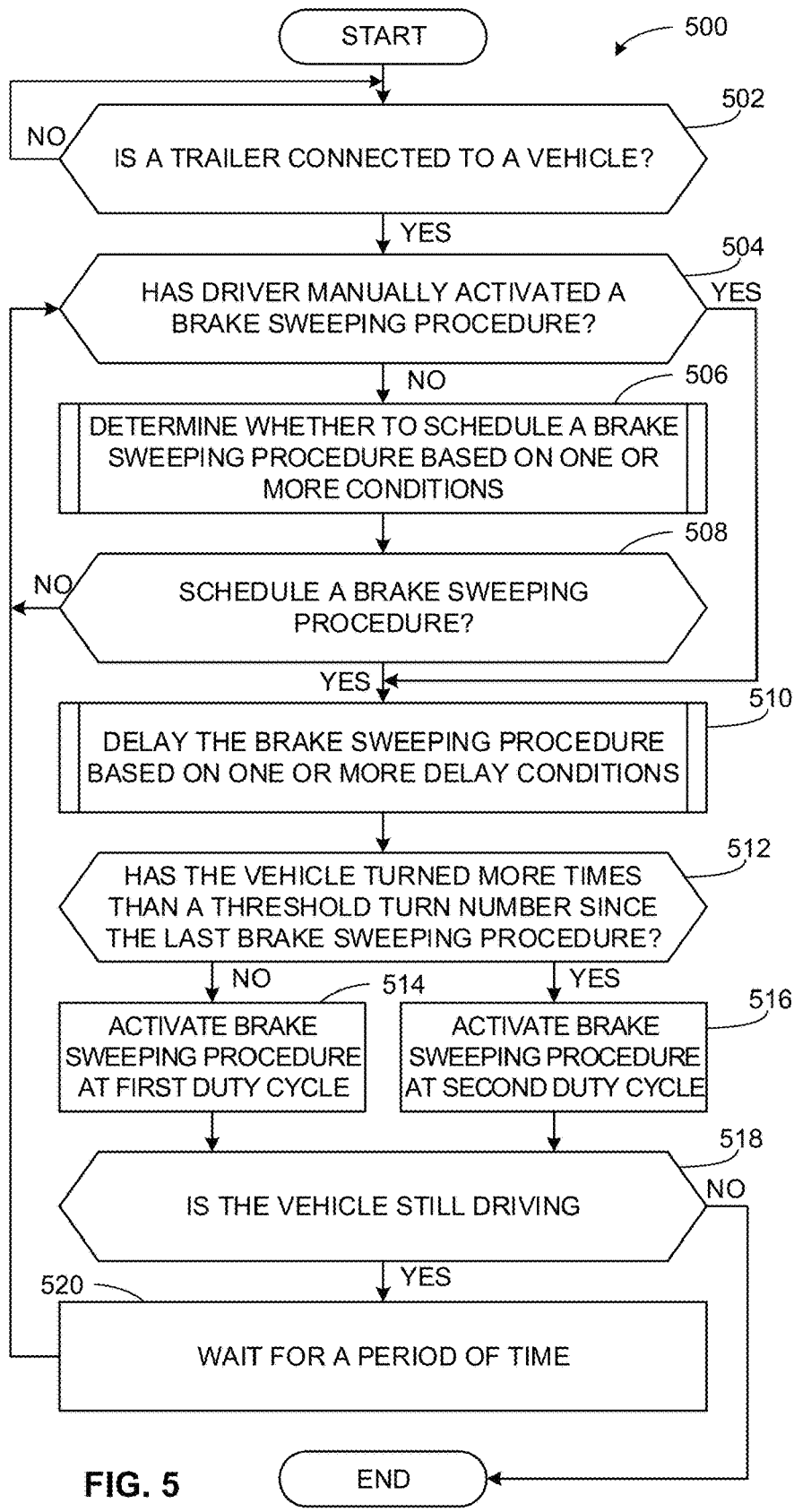
FIG. 5 is a flowchart representative of an example method that may be executed by the example electronic brake controller of FIG. 3 to implement a brake sweeping procedure.
Figure 6:
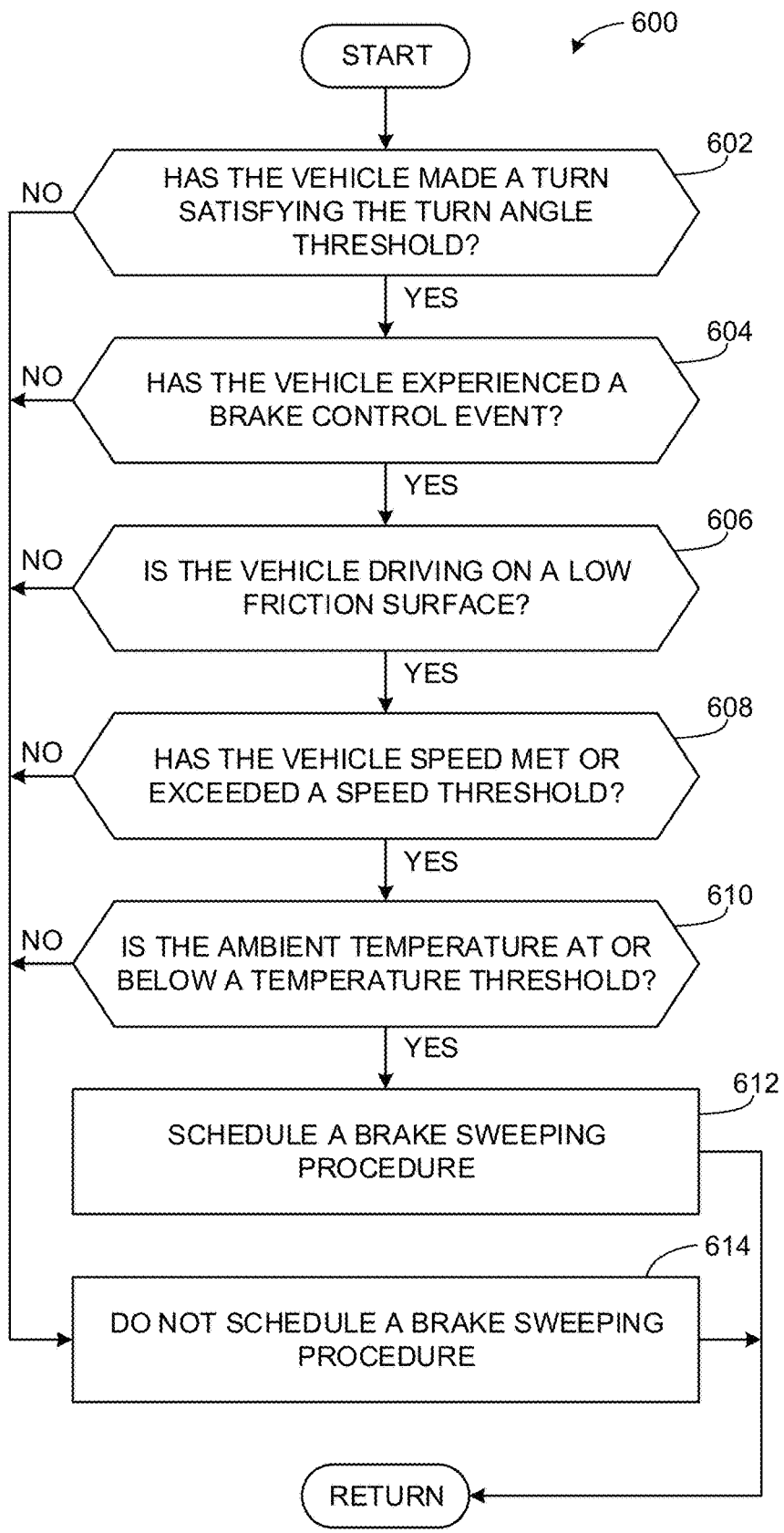
FIG. 6 is a flowchart representative of an example method that may be executed by the example electronic brake controller of FIG. 3 to determine whether to schedule a brake sweeping procedure.
Figure 7:
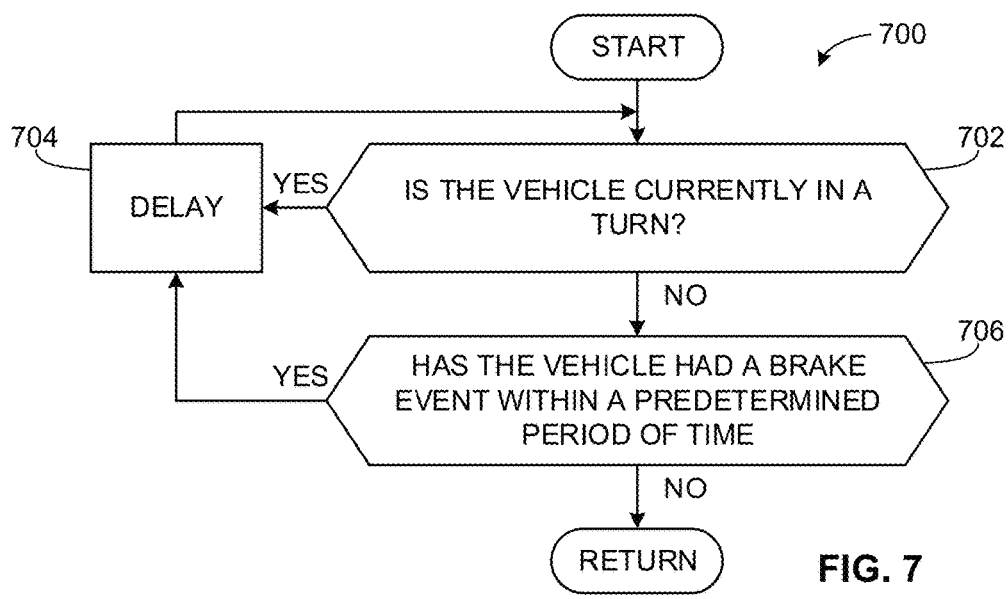
FIG. 7 is a flowchart representative of an example method that may be executed by the example electronic brake controller of FIG. 3 to delay a brake sweeping procedure.

Flowcharts representative of example methods for implementing the electronic brake controller 110 of FIG. 3 are shown in FIG. 5-7. In these examples, the methods may be implemented machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 5-7, many other methods of implementing the example electronic brake controller 110 may alternatively be used. For example, the order of execution of the blocks may be changed, and/or some of the blocks described may be changed, eliminated, or combined.

As mentioned above, the example methods of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart representative of an example method 500 to schedule and perform an example brake sweeping procedure. The example method 500 may be performed at least in part by machine readable instructions executed by the example electronic brake controller 110 of FIG. 3. The example method 500 of FIG. 5 is described in connection with the electric drum brake 200 (FIG. 2) on the trailer 104 of FIG. 1.

At block 502, the sensor data analyzer 304 determines if the trailer 104 is connected to the vehicle 102. In some examples, the sensor data analyzer 304 detects that the trailer 104 is connected to the vehicle 102 based on a signal from the trailer 104 when the trailer cable is connected to the vehicle 102. If the trailer 104 is not connected to the vehicle 102, the sensor data analyzer 304 continues to check until the trailer 104 is connected. Once the trailer 104 is connected to the vehicle 102, the example method 500 continues to block 504. If the example method 500 is performed in connection with another brake, such as a brake on the vehicle 102, block 502 may not be performed.

At block 504, the example user interface 360 determines whether the driver has manually activated a brake sweeping procedure. For example, the driver may initiate a brake sweeping procedure by pushing the manual activation button 370. If the driver initiated the brake sweeping procedure, the example method 500 continue to block 510, discussed in detail further below. If the driver has not manually activated a brake sweeping procedure, the example method 500 continues to block 506.

At block 506, the scheduler 320 determines whether to schedule a brake sweeping procedure based on the one or more condition(s). The scheduler 320 receives information from the sensor data analyzer 304 and compares the information to predetermined thresholds to determine whether a brake sweeping procedure should be scheduled. In some examples, the scheduler 320 schedules a brake sweeping procedure if one condition is satisfied. In other examples, the scheduler 320 schedules a brake sweeping procedure if multiple conditions are satisfied. An example method for determining whether multiple conditions have been met is disclosed in connection with FIG. 6.

If the scheduler 320 determines that the condition(s) has/have not been met, the scheduler 320, at block 508, does not schedule a brake sweeping procedure and the instructions return to block 504. Otherwise, if the scheduler 320 determines that the condition(s) for scheduling a brake sweeping procedure has/have been met, the scheduler 320, at block 508, schedules a brake sweeping procedure.

At block 510, the delayer 332 checks for the presence of one or more delay condition(s). The delayer 332 may delay the brake sweeping procedure if the delay condition(s) has/have been met. An example method for delaying a brake sweeping procedure is disclosed in connection with FIG. 7. If no delay conditions are present, the example method 500 proceeds to block 512.

At block 512, the brake duty cycle modulator 330 receives information from the turn counter 328 regarding the number of turns since the last brake sweeping procedure was performed. The number of turns may be recorded via the turn counter 328, for example. The brake duty cycle modulator 330 compares the number of turns to a threshold turn number or turn threshold. In some examples, a turn is only counted when the vehicle 102 turns at an angle that meets or exceeds an angle threshold (e.g., 30°). If the number of turns does not meet the threshold turn number, the example method 500 proceeds to block 514. If the number of turns does meet the threshold turn number, the example method 500 continues to block 516.

At block 514, the brake duty cycle modulator 330 performs the brake sweeping procedure by activating the brake actuator 302 at a first duty cycle (e.g., a first pressure level). At block 516, the brake duty cycle modulator 330 performs the brake sweeping procedure by activating the brake actuator 302 at a second duty cycle. In some examples, the second duty cycle is greater than the first duty cycle. The first and second brake duty cycles correspond to different pressures applied by the brake. For example, the first duty cycle may correspond to a first pressure (e.g., 15%) while the second duty cycle may correspond to a greater pressure (e.g., 30%) than the first pressure. Thus, the brake duty cycle modulator 330 activates the brake to apply more pressure if the threshold number of turns has been met. In other examples, more than two duty cycles may be selected from based on a number of turns made by the vehicle 102. For example, a first duty cycle may be applied if the vehicle 102 made one turn, a second duty cycle may be applied if the vehicle 102 made two turns, a third duty cycle may be applied if the vehicle made three turns, etc. As the number of turns increases, the likelihood of snow and ice buildup also increases. Thus, the brake duty cycle modulator 330 may increase the pressure applied to the brake as the number of turns rises.

After the brake sweeping procedure is implemented at block 514 or block 516, the electronic control unit 112 determines if the vehicle 102 is still driving. If the vehicle 102 is still driving, the electronic brake controller 110 waits for a period of time (e.g., three minutes) at block 520, and the example method 500 may be repeated again. If the electronic control unit 112 determines the vehicle 102 is no longer driving, the example method 500 ends.

FIG. 6 is a flowchart representative of an example method 600 to determine whether to schedule an example brake sweeping procedure. The example method 600 may be performed at least in part by machine readable instructions executed by the example electronic brake controller 110 of FIG. 3. The example method 600 may be performed to implement example block 506 of FIG. 5.

At block 602, the scheduler 320 determines whether a turn condition has been met. In particular, the scheduler 320 determines whether the vehicle 102 has made a turn that satisfies the turn angle threshold. In some examples, the sensor data analyzer 304 determines an angle of a turn made by the vehicle 102 based on the steering wheel angle sensor 316, and the scheduler 320 compares the angle to the angle threshold. If the vehicle 102 has made a turn that meets the turn angle threshold, the scheduler 320 determines that the turn condition is met. In other examples, the turn threshold may require more than one turn at the angle threshold. For example, the turn condition may require that the vehicle 102 made five or more turns that satisfy the angle threshold. In addition to or as an alternative to the steering wheel angle sensor 316, the scheduler 320 may determine the turn angle of the vehicle 102 based on information received from the IMU 308 and/or the GPS sensor 318. If the scheduler 320 determines vehicle 102 has satisfied the turn angle threshold, the turn condition has been met and the example method 600 continues to block 604.

At block 604, the scheduler 320 determines whether a brake control event has occurred. A brake control event may include activation of the ABS controller 324 and/or the ESC system controller 326. In some examples, the scheduler 320 determines whether a brake control event has occurred within a period of time (e.g., five minutes). If the scheduler 320 determines a brake control event has occurred, the scheduler 320 determines the brake control event condition has been met and the example method 600 continues to block 606.

At block 606, the scheduler 320 determines whether the vehicle 102 is driving on a low friction surface. In some examples, the scheduler 320 determines whether the vehicle 102 is driving on a low friction surface based on the propulsive wheel torque measurement of the vehicle 102. For example, if the propulsive wheel torque measurement is below a threshold wheel torque, the wheel torque condition is met. In some examples, the sensor data analyzer 304 receives the propulsive wheel torque measurement from the wheel torque sensor 310 and/or determines the wheel torque based on one or more parameters, such as RPM, spark timing, etc. In some examples, a low propulsive wheel torque is indicative that the vehicle 102 is driving on a low friction surface. If the scheduler 320 determines the vehicle 102 is driving on a low friction surface (e.g., if the propulsive wheel torque is below the threshold wheel torque), the wheel torque condition is met and the method 600 continues to block 608.

At block 608, the scheduler 320 determines whether a speed condition has been met by comparing the speed of the vehicle 102 to a speed threshold. The speed threshold may be, for example, 45 mph. If the vehicle speed meets or exceeds the speed threshold, the speed condition is met. In some examples, the sensor data analyzer 304 determines the vehicle speed based on measurements from the wheel speed sensor 306. In other examples, the vehicle speed can be determined by the IMU 308 and/or the GPS sensor 318. If the scheduler 320 determines the vehicle speed meets or exceeds the speed threshold, the example method 600 continues to block 610.

At block 610, the scheduler 320 determines whether a temperature condition has been met by comparing the ambient temperature outside the vehicle 102 to a temperature threshold. The temperature threshold may be, for example, 0° C. If the ambient temperature is at or below the temperature threshold, the temperature condition is met. In some examples, the sensor data analyzer 304 determines the ambient temperature based on measurements from the temperature sensor 314. If the scheduler 320 determines the ambient temperature is at or below the temperature threshold, the example method 600 continue to block 612.

If all of the conditions of blocks 602, 604, 606, 608, 610 are met, the example scheduler 320 schedules a brake sweeping procedure at block 612. Otherwise if one or multiple ones of the conditions have not been met, the scheduler 320 does not schedule a brake sweeping procedure at block 614. The example scheduler 320 may continue to monitor the information from the vehicle sensors until all of the conditions are met. In the illustrated example, all five conditions are needed to schedule a brake sweeping procedure. However, in other examples, only one condition or a subset (e.g., two, three or four) of the condition(s) may need to be met. The example condition(s) may be checked in any order and/or simultaneously.

FIG. 7 is a flowchart representative of an example method 700 for determining whether to delay a brake sweeping procedure. The example method 700 may be performed at least in part by machine readable instructions executed by the example electronic brake controller 110 of FIG. 3. The example method 700 may be performed to implement block 510 of FIG. 5.

At block 702, the delayer 332 determines if the vehicle 102 is currently in a turn satisfying a turn angle threshold. The turn angle threshold may be, for example, 10°. If the vehicle is turning at an angle greater than or equal to the turn angle threshold in either direction, the delay condition is met. In some examples, the sensor data analyzer 304 determines an angle of the vehicle based on an angle of the steering wheel sensed by the steering wheel angle sensor 316. If the turn angle of the vehicle 102 meets the turn angle threshold, the delayer 332 delays the brake sweeping procedure at block 704. In some examples, the brake sweeping procedure is delayed 10 seconds. In other examples, the delay time may be longer (e.g., 20 seconds, 30 seconds, etc.) or shorter (e.g., 2 seconds, 3 seconds, etc.).

If the delayer 332 determines the vehicle is not currently in a turn, the delayer 332 determines whether the brake 200 has been actuated within a period of time (e.g., 2 minutes). If the delayer 332 determines the brakes have been actuated within the period of time, the delayer 332 delays the brake sweeping procedure at block 704. In some examples, the brake sweeping procedure is delayed for 3 minutes. In other examples, the delay time may be longer (e.g., 5 minutes, 10 minutes, etc.) or shorter (e.g., 1 minutes, 2 minutes, etc.). In some examples, the delay time for meeting the condition in block 702 is the same for meeting the delay condition in block 706. In other examples, different delay times may be implemented. Otherwise, if neither condition in blocks 702 and 706 are met, the brake sweeping procedure is performed.

Figure 8:
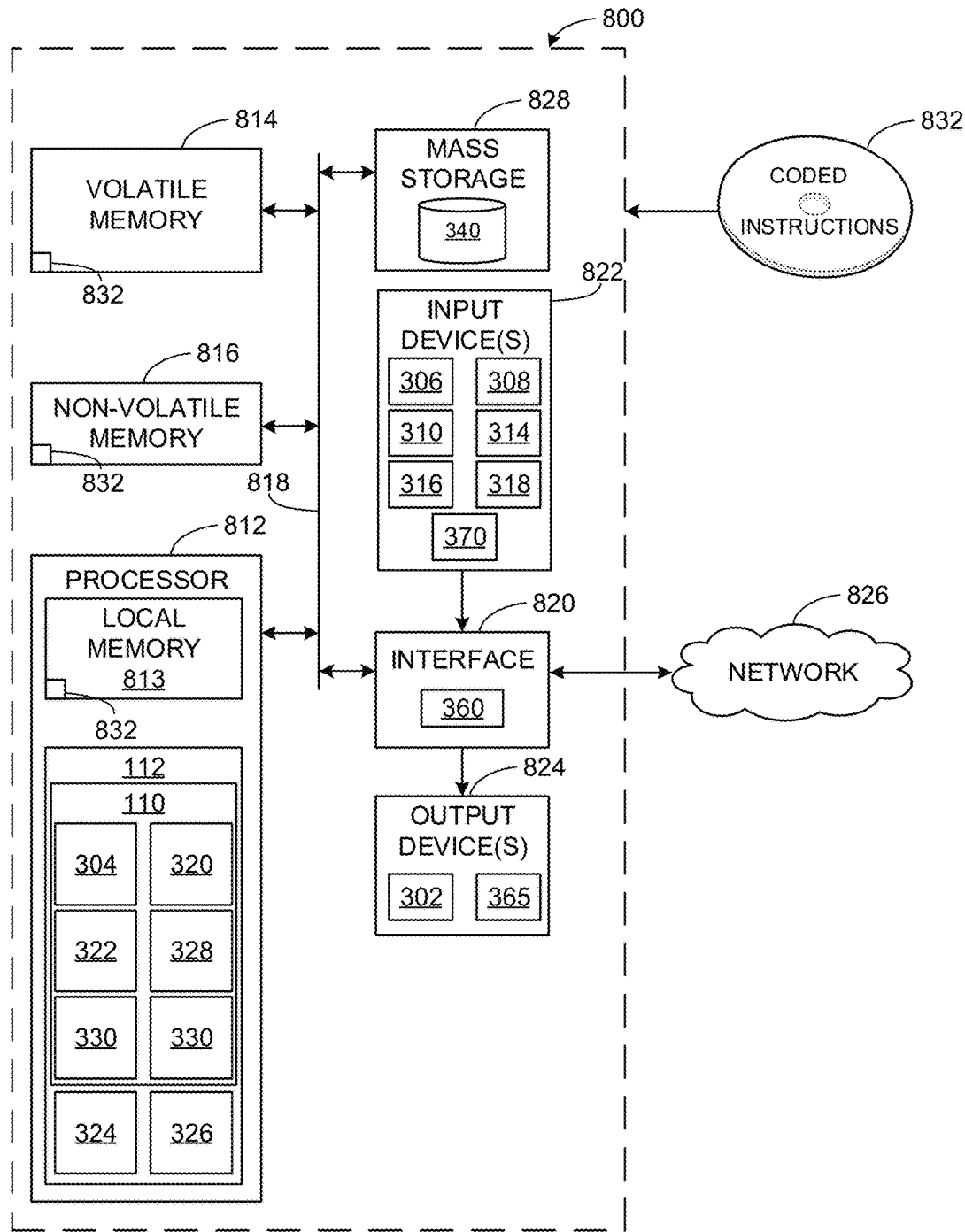
FIG. 8 is an example processor platform diagram that may implement the methods of FIG. 5, FIG. 6 and FIG. 7 and the example electronic brake controller of FIG. 3.

FIG. 8 is a block diagram of an example processor platform 800 capable of executing instructions to implement the method of FIGS. 5-7 and the electronic control unit 112 and/or the example electronic brake controller 110 of FIG. 1. The processor platform 800 can be, for example, a server, a personal computer, a mobile device (e.g., a cell phone, a smart phone, a tablet such as an iPad™), a personal digital assistant (PDA), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example, the processor 812 may implement the example electronic control unit 112, the example electronic brake controller 110, the example sensor data analyzer 304, the example scheduler 320, the example delayer 332, the example brake event detector 322, the example turn counter 328, the example brake duty cycle modulator 230, the example ABS controller 324, and/or the example ESC system controller 326.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface. In the illustrated example, the interface 820 may implement the example user interface 360.

In the illustrated example, one or more input devices 822 are connected to the interface circuit 820. The input device(s) 822 permit(s) a user to enter data and commands into the processor 812. The input device(s) 822 can be implemented by, for example, an audio sensor, a microphone, a camera (still or video), a keyboard, a button, a mouse, a touchscreen, a track-pad, a trackball, isopoint and/or a voice recognition system. In the illustrated example, the input device(s) 822 may implement the example wheel speed sensor 306, the example IMU 308, the example wheel torque sensor 310, the example temperature sensor 314, the example steering wheel angle sensor 316, the example GPS sensor 318, and/or the example manual activation button 370.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor. In the illustrated example, the output device(s) 824 may implement the example brake actuator 302 and/or the example indicator 365.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. In this example, the mass storage devices 828 may include the example database 340.

Coded instructions 832 to implement the methods 500, 600, 700 of FIGS. 5-7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture may be used to schedule and perform a brake sweeping procedure to remove snow, ice and/or other debris from a vehicle brake. Examples disclosed herein determine when to schedule a brake sweeping procedure based on one or more conditions that may be indicative of snow and ice buildup. By removing the snow, ice and/or other debris the brake, examples disclosed herein ensure the brake is functional when the driver activates the brake, which may otherwise not operate effectively if the snow, ice and/or other debris is allowed to remain on the brake. Additionally, examples disclosed herein may be employed to delay a brake sweeping procedure if it is not an optimal or safe time to perform the brake sweeping procedure. Thus, examples disclosed herein ensure safer conditions when implementing a brake sweeping procedure.

While the examples disclosed herein are described in connection with an electric drum brake on a trailer, the examples disclosed herein can likewise be implemented with any other type of brake on a vehicle and/or any other trailer or equipment towed behind a vehicle. Further, the examples disclosed herein may be implemented with brakes on other types of vehicles, such as brakes on trains, wheels brakes on aircraft, and/or other type of vehicle having a brake that may be affected by snow, ice and/or other debris.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a controller to:
        determine when a vehicle has made a turn;
        compare an angle at which the vehicle has turned to an angle threshold; and
        schedule a brake sweeping procedure based on the comparison.

2. The apparatus of claim 1, wherein the brake sweeping procedure includes a modulation of a vehicle brake to remove debris from the vehicle brake.

3. The apparatus of claim 1, wherein the controller is to schedule the brake sweeping procedure based on the comparison and a propulsive wheel torque measurement.

4. The apparatus of claim 3, wherein the propulsive wheel torque measurement is a torque between a wheel of the vehicle and a driving surface.

5. The apparatus of claim 1, wherein the controller is to schedule the brake sweeping procedure based on the comparison and an occurrence of a brake control event.

6. The apparatus of claim 5, wherein the brake control event includes activation of at least one of an anti-lock brake system, a traction control system, a stability control system, or a yaw control system.

7. The apparatus of claim 1, wherein the controller is to activate a vehicle brake to perform the brake sweeping procedure at a predetermined pressure.

8. The apparatus of claim 7, wherein the predetermined pressure is based on a number of turns made by the vehicle.

9. The apparatus of claim 8, wherein, if the number of turns meets a turn threshold, the controller activates the brake at a first level of pressure and, if the number of turns does not meet the turn threshold, the controller activates the brake at a second level of pressure lower than the first level of pressure.

10. A non-transitory computer readable storage medium comprising instructions that, when executed, cause a controller to at least:
    schedule a brake sweeping procedure to be performed by a brake of a vehicle;
    determine whether at least one delay condition has been met, the at least one delay condition based on whether the vehicle is turning at an angle greater than an angle threshold; and
    delay the brake sweeping procedure when the at least one delay condition has been met.

11. The non-transitory computer readable storage medium of claim 10, wherein the angle threshold is 10 degrees.

12. The non-transitory computer readable storage medium of claim 10, wherein the at least one delay condition is based on an occurrence of a braking event within a period of time.

13. The non-transitory computer readable storage medium of claim 10, wherein, after the brake sweeping procedure is delayed, the instructions, when executed, cause the controller to re-determine whether the at least one delay condition has been met.

14. The non-transitory computer readable storage medium of claim 10, wherein the instructions, when executed, further cause the controller to activate the brake to perform the brake sweeping procedure when the at least one delay condition has not been met.

15. A non-transitory computer readable storage medium comprising instructions that, when executed, cause a controller to at least:
    schedule a brake sweeping procedure to be performed by a brake of a vehicle;
    determine a number of turns the vehicle has made within a period of time; and
    select a pressure to be applied by the brake during the brake sweeping procedure based on the number of turns.

16. The non-transitory computer readable storage medium of claim 15, wherein the instructions, when executed, further cause the controller to activate the brake to perform the brake sweeping procedure at the selected pressure.

17. The non-transitory computer readable storage medium of claim 15, wherein the instructions, when executed, cause the controller to select the pressure by selecting a first level of pressure when the number of turns meets a turn threshold and selecting a second level of pressure when the number of turns does not meet the turn threshold.

18. The non-transitory computer readable storage medium of claim 17, wherein the first level of pressure is greater than the second level of pressure.

19. The non-transitory computer readable storage medium of claim 18, wherein the first level of pressure associated with a 30% duty cycle and the second level of pressure associated with a 15% duty cycle.

* * * * *